United States Patent Office 2,964,404
Patented Dec. 13, 1960

2,964,404

HARDENING OF GELATIN WITH AZIRIDINYL-SULFONYL COMPOUNDS

Donald M. Burness, Rochester, N.Y., assignor to Eastman Kodak Company, Rochester, N.Y., a corporation of New Jersey No Drawing. Filed July 26, 1957, Ser. No. 674,311

8 Claims. (Cl. 96—85)

This invention relates to the hardening of gelatin to enhance its resistance to water by incorporating therein compounds containing aziridinyl and sulfonyl groups.

In the use of gelatin, particularly for photographic purposes, the gelatin is often treated with a succession of aqueous baths which vary in pH or which have raised temperatures. There has been a great deal of work done on the treatment of gelatin to improve its resistance to water so that swelling and melting of the gelatin does not occur upon treatment thereof with aqueous solutions in processing operations or in hot drying. The compounds which have heretofore been found useful for the treatment of gelatin so as to prevent the swelling or melting thereof under processing conditions fall under four or possibly three classes as follows:

(1) Metallic salts such as those of chromium, aluminum, and zirconium;
(2) Aldehydes such as formaldehyde or mucochloric acid;
(3) 1,2- or 1,4-diketones;
(4) Quinones which possibly might be considered as diketones.

These hardeners, however, have in many instances, exhibited unwanted photographic effects of one kind or another. For instance, hardeners of the aldehyde type sometimes show a tendency to cause an increase in fogging of the emulsion when employed for hardening therein. Other types of hardeners have a tendency to cause loss of speed of the emulsion upon storage thereof. It is desirable that hardeners for gelatin when used in photographic emulsions do not adversely affect the photographic characteristics of the emulsion.

One object of my invention is to provide hardeners for gelatin which exhibit no known detrimental photographic effects. Another object of my invention is to provide materials which when mixed with gelatin will render the same resistant to the effects of water of varying pH or at elevated temperatures. A further object of my invention is to provide for the hardening of gelatin by the use of compounds having both aziridine and sulfonyl groups. Other objects of my invention will appear herein.

I have found that gelatin is rendered resistant to the effects of water even at elevated temperatures by incorporating therein compounds having at least two aziridine groups, which groups are linked together by sulfonyl groups. Typical formulas for compounds useful for my purposes are the following:

(I) 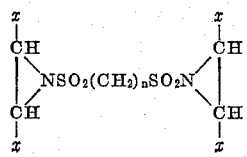

(II) 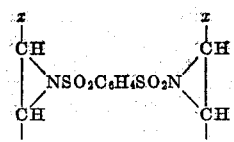

(III) 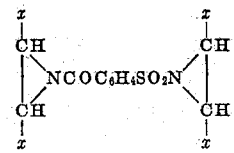

A. Wherein $x$ are hydrogen or alkyl substituents, $n$ is an integer from 1 to 4 and the $C_6H_4$ radical is ortho- or meta-.

My invention is conveniently carried out by mixing gelatin in the form of its aqueous solution with one or more hardeners corresponding to the above formulas. There are no critical limits on the proportions of the sulfonyl aziridines which may be added to the gelatin compositions. However, as a rule, an amount of these compounds of at least 0.5 percent based on the weight of the gelatin gives a decided hardening of the gelatin. For economic reasons it is ordinarily desirable not to use more than 5 percent of the hardening compound.

The following examples illustrate the preparation of compounds of the type described herein which are suitable for hardening purposes for gelatin coatings:

*Example 1*

To a solution of 17.2 grams of ethylene imine and 40.8 grams of triethylamine in 200 ml. of benzene cooled to 0° C. was added a solution of 48.2 grams of 1,3-propane bis(sulfonyl chloride) dropwise with stirring. The mass was maintained at less than 5° C. for 1 hour and the mixture obtained was filtered to remove triethylamine hydrochloride. The latter was extracted with 1.5 liters of ether to remove any undissolved product which was recovered by evaporation of the ether. The major portion of the product crystallized from the benzene filtrate upon the addition thereto of hexane. Recrystallization of the product from ether solution provided 11.4 grams of colorless crystals having a melting point of 72–73° C. This material was 1,3-bis(1-aziridinylsulfonyl)-propane.

*Example 2*

A reaction was carried out similarly to that given in the preceding example except that 47.8 grams of m-chlorosulfonyl benzoyl chloride was employed instead of the propane bis(sulfonyl chloride) and there was produced thereby 40 grams of 1-(1-aziridinylcarbonyl)-3-(1-aziridinylsulfonyl)-benzene when the benzene filtrate was treated with hexane. The product was extracted with ethyl acetate and by crystallization there was obtained 10 grams of colorless crystals having a partial indefinite melting point of about 107° C.

In using these hardeners in aqueous gelatin compositions, it is ordinarily desirable that they first be dissolved in water or in inert solvent and added to the gelatin composition in the form of their solution. If a photographic emulsion is being hardened, the solvent used for incorporating the hardener should be one that has no detrimental effect thereon.

The compounds which we have found useful as hardeners for gelatin applied as a coating from its aqueous solution are those which have at least two aziridine groups therein, which aziridine groups are connected by sulfonyl groups. Although some hardening effect is obtained when the aziridine compound is used in the gelatin coating compositions in an amount even less than 0.1 part per 100 parts of gelatin, it is ordinarily desirable to employ at least 0.1 part of the aziridine compound per 100 parts of gelatin to get substantial hardening. Various proportions of hardening agents in accordance with my invention have been used, such as 0.1 part, 1¼ parts, 5 parts, 10 parts, up to approximately 25 parts or more per 100 parts of gelatin and effective hardening of the gelatin layers has resulted. The hardeners described herein are especially useful for use in gelatin-silver halide photographic emulsion compositions.

A portion of a photographic emulsion after incorporating therein 2.26 percent by weight based on dry gelatin of 1,3-bis(1-aziridinylsulfonyl)-propane was coated out on a support. Another portion of this emulsion but in which 2.26 percent by weight based on dry gelatin of 1-aziridinylcarbonyl-3-aziridinylsulfonyl-benzene was incorporated therein was coated out onto a support therefor. A third portion of the emulsion in which no hardener had been incorporated was coated out onto a support. Whereas the emulsion coating without hardener when immersed in water dissolved when the water was heated to a temperature of 84° C., the samples in which hardener had been incorporated withstood melting in water up to temperatures of 212° F. It was found that the emulsions containing hardener exhibited less fog both when fresh and after keeping for one week at 120° F.

The emulsions in which hardeners are incorporated in accordance with my invention may be coated out onto any type of support such as cellulose ester film base, paper, fabric, glass, etc. to form photographic products. The emulsions in accordance with my invention will cling to the support therefor until a temperature is reached (when the emulsion is immersed in water) that the emulsion itself melts and thereby separates from the emulsion support. The emulsion in accordance with our invention may be sensitized or otherwise treated in its manufacture as is conventional for gelatin-silver halide photographic emulsions. The testing of the melting point of the gelatin coatings is carried out by immersing the coated film base in water, the temperature of which is then increased until a point is reached where melting of the gelatin occurs.

The hardeners which I have described are useful in various kinds of gelatin photographic emulsions. In addition to being useful in non-optically sensitized emulsions, they may also be useful in orthochromatic, panchromatic and X-ray emulsions. They may also be added to the emulsion before or after any sensitizing dyes or other sensitizers which are used. Various silver salts may be used as the sensitive salt, such as silver bromide, silver chloride or mixed silver halides such as silver chlorobromide or silver bromoiodide. The hardening agents in accordance with our invention may be used in gelatin emulsions intended for color photography; for example, emulsions containing color-forming couplers or emulsions to be developed by solutions containing couplers.

I claim:

1. A photographic element containing a silver halide-gelatin photographic emulsion layer containing, per 100 parts of gelatin, 0.1-5 parts of a compound having at least two aziridine groups in which each nitrogen is linked to the nitrogen of another aziridine group by a chain including a sulfonyl group attached to the nitrogen of at least one said aziridine group.

2. A photographic element comprising a silver halide-gelatin photographic emulsion layer containing, per 100 parts of gelatin, 0.1-5 parts of a compound having the formula:

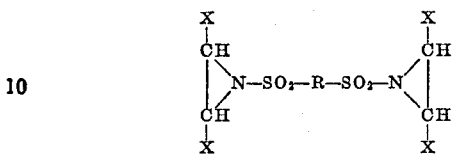

in which formula R is selected from the group consisting of $(CH_2)_n$, $n$ being 1-4, ortho $C_6H_4$ and meta $C_6H_4$ and each X is selected from the group consisting of hydrogen and alkyls of 1-4 carbon atoms.

3. A photographic element comprising a gelatin-silver halide photographic emulsion layer containing, per 100 parts of gelatin, 0.1-5 parts of 1,3-bis(1-aziridinylsulfonyl)propane.

4. A photographic element comprising a gelatin-silver halide photographic emulsion layer containing, per 100 parts of gelatin, 0.1-5 parts of 1-(1-aziridinylcarbonyl)-3-(1-aziridinylsulfonyl)benzene.

5. A support having thereon a gelatin-silver halide photographic emulsion layer containing, per 100 parts of gelatin, 0.1-5 parts of a compound having at least two aziridine groups in which each nitrogen is linked to the nitrogen of another aziridine group by a chain including a sulfonyl group attached to the nitrogen of at least one said aziridine group.

6. A photographic film comprising a cellulose ester film base having thereon a gelatin-silver halide photographic emulsion layer containing, per 100 parts of gelatin, 0.1-5 parts of a compound having at least two aziridine groups in which each nitrogen is linked to the nitrogen of another aziridine group by a chain including a sulfonyl group attached to the nitrogen of at least one said aziridine group.

7. A photographic paper comprising a paper base support having thereon a coating of a gelatin-silver halide photographic emulsion layer containing, per 100 parts of gelatin, 0.1-5 parts of a hardening agent composed of a compound having at least two aziridine groups in which each nitrogen is linked to the nitrogen of another aziridine group by a chain including a sulfonyl group attached to the nitrogen of at least one said aziridine group.

8. A support containing thereon a coating of a gelatin-silver halide photographic emulsion containing, per 100 parts of gelatin, 0.1-5 parts of 1,3-bis(1-aziridinyl sulfonyl)-propane.

References Cited in the file of this patent

UNITED STATES PATENTS

| | | |
|---|---|---|
| 2,247,569 | Brunken et al. | July 1, 1941 |
| 2,726,162 | Allen et al. | Dec. 6, 1955 |

FOREIGN PATENTS

| | | |
|---|---|---|
| 900,137 | Germany | Dec. 21, 1953 |
| 899,955 | France | June 15, 1945 |
| 1,147,763 | France | June 11, 1957 |